Dec. 28, 1965

W. A. PALMER 3,225,991

INTERMITTENT FILM TRANSPORT AND METHOD

Filed March 1, 1963

INVENTOR.
William A. Palmer
BY
Attorneys

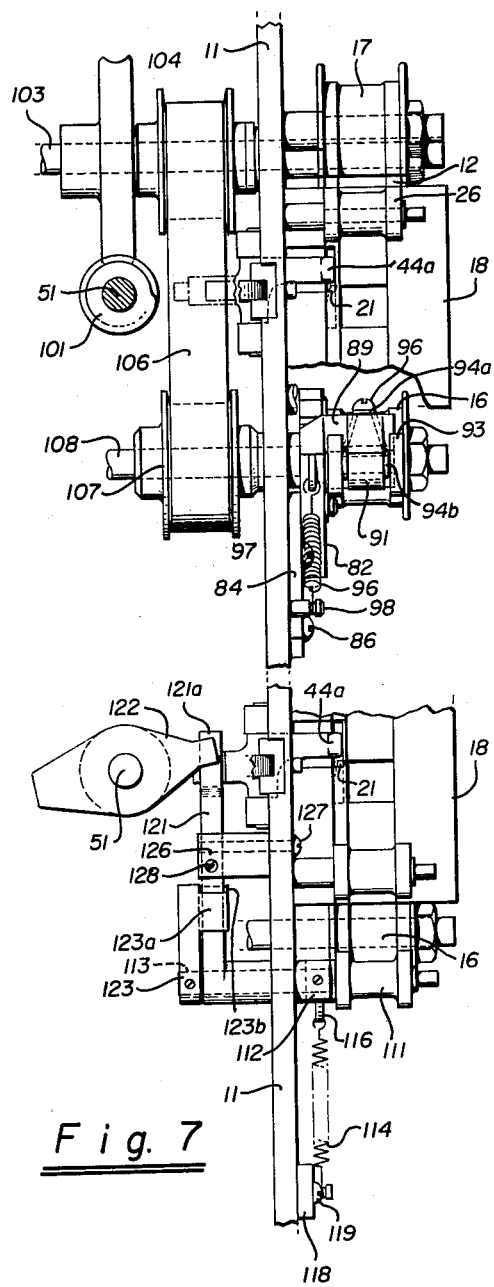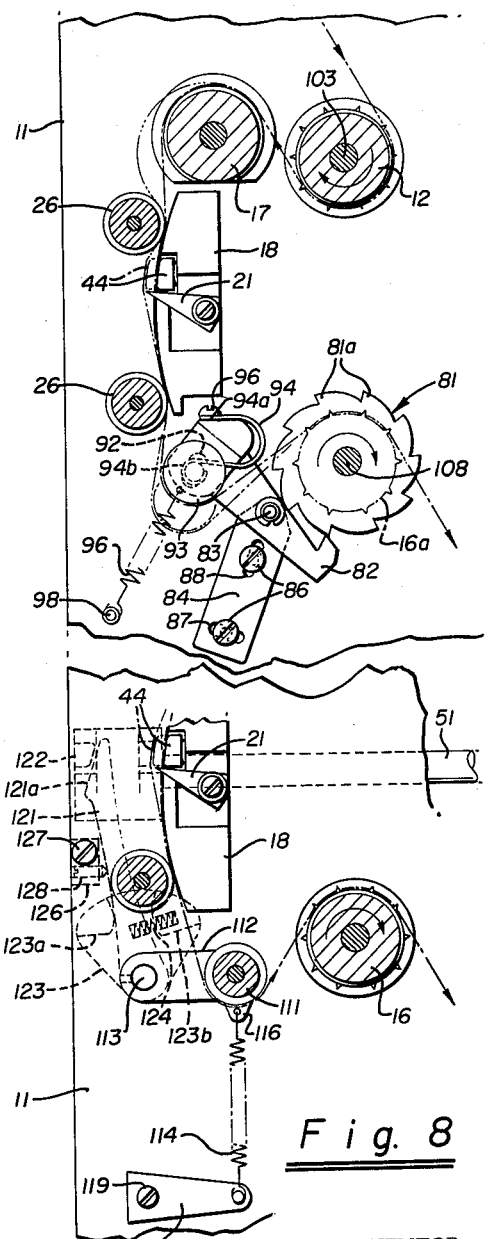

United States Patent Office 3,225,991
Patented Dec. 28, 1965

3,225,991
INTERMITTENT FILM TRANSPORT
AND METHOD
William A. Palmer, Menlo Park, Calif., assignor to W. A. Palmer Films, Inc., San Francisco, Calif., a corporation of California
Filed Mar. 1, 1963, Ser. No. 262,002
8 Claims. (Cl. 226—56)

This invention relates to an intermittent film transport and method and more particularly to an intermittent film transport and method which makes it possible to obtain a very fast film pull-down.

In my copending application Serial No. 151,811, filed November 13, 1961, I have disclosed an intermittent film transport and method which makes it possible to obtain a rapid film pull-down. Although I have found that this intermittent film transport performs very satisfactorily in many applications, I have found certain applications where a very rapid film pull-down and precise registration is required as, for example, in high quality video recording. This is to overcome any non-uniformity in the raster lines which causes some "twinning" of the lines. It is believed that this "twinning" of the lines is caused by a slight shift of the emulsion surface of the film between two exposures. It is believed that this slight movement of the emulsion may be caused by the fact that the tension on the film is continuously increased during the time that the film is held stationary by the register pin. Also, this increase in tension possibly causes some stretching of the perforation on the register pin. There is, therefore, a need for a new and improved intermittent film transport and method which overcomes the above named disadvantages.

In general, it is an object of the present invention to provide an intermittent film transport and method which can be utilized for overcoming the above named disadvantages.

Another object of the invention is to provide an intermittent film transport and method of the above character in which the tension on the film is substantially uniform while the film or element is held in a stationary position.

Another object of the invention is to provide an intermittent film transport and method of the above character in which relatively small stresses are placed on the film during the time that exposure is taking place so that the emulsion will not be shifted and also to prevent stretching of the perforations in the film.

Another object of the invention is to provide an intermittent film transport and method of the above character in which relatively large forces are applied to the film after it has been removed from the registration pin to accelerate it rapidly downward.

Another object of the invention is to provide an intermittent film transport of the above character which is readily adjustable.

Additional objects and features of the invention will appear from the following description in which the preferred embodiments are set forth in detail in conjunction with the accompanying drawings.

Referring to the drawings:

FIGURE 5 is a front elevational view of another embodiment of my intermittent film transport.

FIGURE 6 is a side elevational view of the intermittent film transport shown in FIGURE 5.

FIGURE 7 is a front elevational view of still another embodiment of my intermittent film transport.

FIGURE 8 is a side elevational view of the intermittent film transport shown in FIGURE 7.

Figure 1:
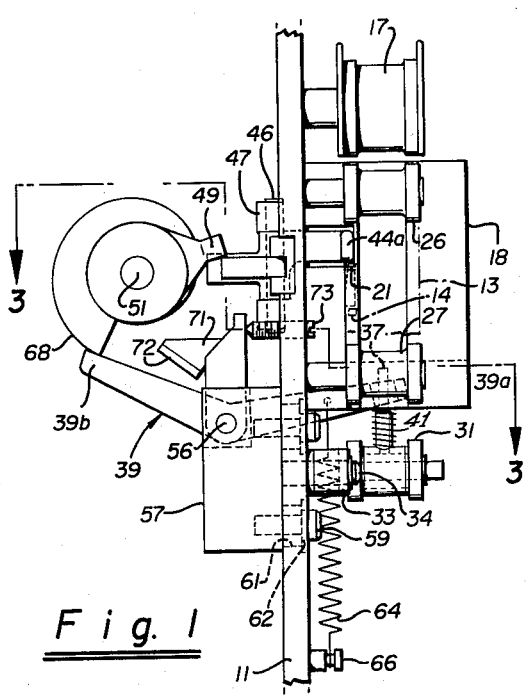
FIGURE 1 is a front elevational view of an intermittent film transport incorporating my invention.

In general, my intermittent film transport for advancing a flexible elongate element having perforations therein consists of a registration pin adapted to engage the perforations in the element to hold the element stationary in a predetermined zone. Means is provided on one side of the registration pin for advancing the element and means is provided on the other side of the registration pin for taking up the element. Means engaging the element between the registration pin and the take-up means is provided to urge the element past the registration pin. Means is provided for intermittently causing relative movement between the registration pin and the element so that the registration pin is out of engagement with the element to thereby permit the means yieldably applying a force to the element to draw the element past the registration pin. Means is also provided for applying additional forces to the element when the element is out of engagement with the registration pin to accelerate the movement of the element past the registration pin.

More in particular, my intermittent film transport as shown in FIGURES 1–4 consists of a mounting plate 11. Means in the form of a feed sprocket 12 is provided for continuously advancing an elongate element such as film 13 which is provided with a row of perforations 14 extending longitudinally of the film adjacent one side as shown particularly in FIGURE 1. Means in the form of a take-up sprocket 16 is provided for continuously taking up the film 13. Means (not shown) is provided for driving both the feed sprocket 12 and the take-up sprocket 16 in synchronism and at a predetermined speed to move the film at a desired speed.

The film 13, as it leaves the feed sprocket 12, passes over a substantially cylindrical snubbing post 17 which is affixed to the mounting plate 11. The snubbing post 17 which also may be called an arresting guide as shown is provided with a relatively large surface for arresting the movement of the film 13 as hereinafter described. After the film leaves the snubbing post 17, it passes over a film shoe 18. This film shoe 18 is relatively elongate as shown and is provided with a convex surface 19 which is adapted to be engaged by the film 13. The film shoe is provided with this slight curvature to prevent cupping of the film as it passes over the shoe.

Figure 2:
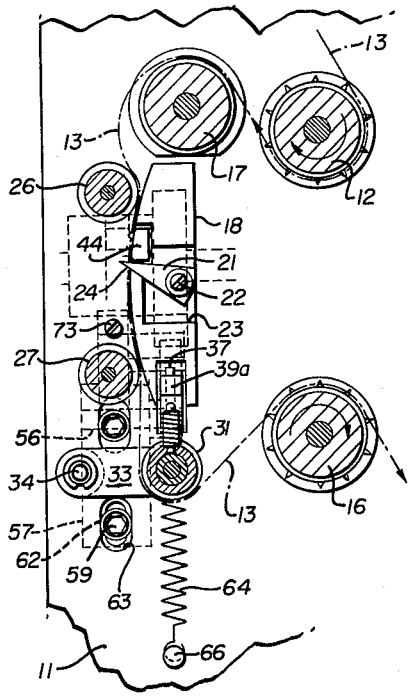
FIGURE 2 is a side elevational view of the intermittent film transport shown in FIGURE 1.
Figure 3:
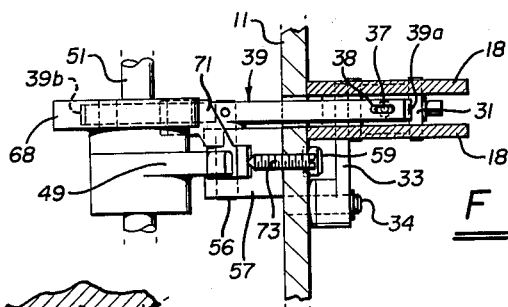
FIGURE 3 is a cross-sectional view taken along the line 3—3 of FIGURE 1.
Figure 4:
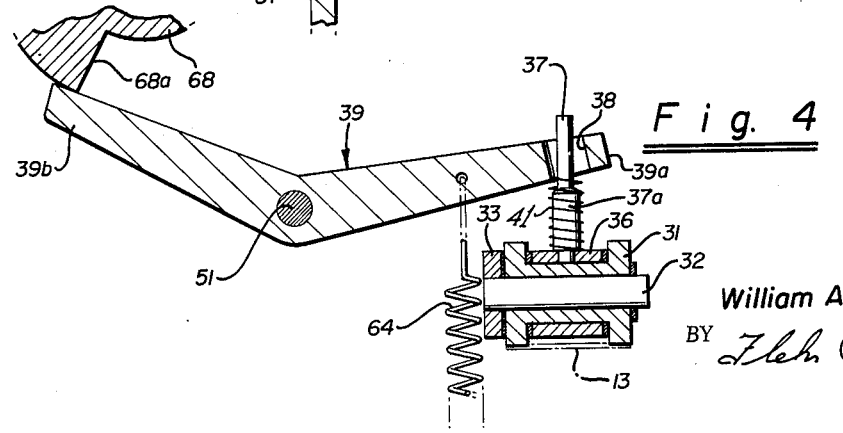
FIGURE 4 is an enlarged detail view in cross-section of a portion of the apparatus shown in FIGURE 1.

Means is associated with the film shoe 18 for registering the film with respect to the film shoe and consists of a registration pin 21 which is substantially triangular in shape as shown particularly in FIGURE 2 and which is mounted within a rectangular recess 23 provided within the shoe. The registration pin is secured to a side wall of the recess 23 by suitable means such as a screw 23. The pointed end of the registration pin 21 extends through a small hole 24 in the shoe so that it protrudes out in front of the shoe as shown particularly in FIGURE 2. The hole or aperture 24 is shaped so that the registration pin is inclined upwardly at a substantial angle as, for example, an angle of approximately 30°. The point of the registration pin 21 is positioned so that it is adapted to engage the perforations 14 provided in the film 13 which is moved over the shoe.

Means is provided for retaining the film in engagement with the convex surface 19 of the shoe and consists of rollers 26 and 27. These rollers 26 and 27 engage the film substantially above and below the exposure zone for the film.

Means is provided for placing moderate tension on the film to continuously and yieldably urge the film across the registration pin 21 and the shoe 18 from the snubbing post 17 and consists of a roller 31 which is rotatably mounted upon a pin 32. The pin 32 is affixed to the free end of a lever 33. The other end of the lever 33 is pivotally mounted on a pin 34 provided in the mounting plate 11. A sleeve 36 is rotatably mounted on the roller 31. A vertical upstanding pin 37 is affixed to the sleeve 36 and extends upwardly into an elongated slot 38 provided in end 39a of a lever 39. A spring 41 is mounted on the pin 37 and has one end engaging the sleeve 36 and has the other end engaging the end 39a. As hereinafter explained, the spring 41 serves to continuously and yieldably urge the roller 31 and the film 13 across the registration pin 21 and the shoe 18.

Means is provided for causing relative movement between the film 13 and the registration pin 21 so that the film is no longer held by the registration pin. This means intermittently moves the film 13 from the registration pin 21 to permit the means yieldably applying a force to the film to advance the film downwardly over the registration pin and past the film shoe 18 until another perforation in the film engages the registration pin 21. This means consists of a push-off bar 44 which is mounted within a recess 45 provided in the film shoe 18. This push-off bar is provided with an inclined surface 44a which is adapted to engage the outer margin of the film having perforations therein. The push-off bar 44 is pivotally mounted for swinging movement about a pin 46 which is carried in a block 47 and secured to the mounting plate 11. Means is provided as described in copending application Serial No. 151,811, filed November 13, 1961 for normally retaining the push-off bar 44 in the recess 45 and out of engagement with the film 13.

Means is provided for operating the push-off bar 44 so that it pushes the film off the registration pin 21 and consists of a cam member 49 affixed to a rotating shutter shaft 51. The push-off bar 44 and the cam member 49 are provided with cooperating cam surfaces which when they engage upon each rotation of the cam member 49, the portion of the push-off bar 44 underlying the film is moved to the left as viewed in FIGURE 2 to move the film 13 off of the registration pin 21 and to permit it to be moved downwardly under the force of the spring 41.

Additional means is provided for accelerating the film 13 after it is released from the registration pin 21 as well as the roller 31 and its associated mechanism. The roller 31 and its associated mechanism have considerable mass so that a considerable force is required for rapidly accelerating this mass. This means for providing additional acceleration consists of the lever 39 hereinbefore described which is pivotally mounted on a pin 56 carried by a block 57. The block 57 is secured to the mounting plate 11 in a suitable manner so as to permit vertical adjustment of the block. For example, as shown in the drawings, the block 57 can be secured by cap screws 59 extending through elongate slots 61 provided in the mounting plate 11 and threaded into the block 57. Washers 62 are provided on the cap screws and ride in recesses 63 provided in the mounting plate 11. It can be seen that by merely loosening the cap screws 59, the block 57 can be shifted longitudinally within the slots 61.

A relatively strong spring 64 has one end secured to the lever arm 39 on end 39a at a point which is between the pivot pin 56 and the point at which the spring 41 engages the arm 39. The other end of the spring is secured to a pin 66 provided on the mounting plate 11. This spring 64 exerts a force on the lever 39 which is substantially greater than the force which is exerted by the spring 41 and causes the other end 39b of the lever 39 to be maintained in yieldable and continuous engagement with a spiral-shaped cam 68 which is also affixed to the shaft 51 to rotate with the shaft 51. The spiral-shaped cam 68 is provided with a substantially radially extending edge 68a for a purpose hereinafter described.

A block 71 is pivotally mounted on the pin 56 and is provided with an inclined surface 72 with suitable material such as Nylatron which serves as a stop or buffer for the lever 39 when it is released by the spiral-like cam 68. Means is provided for adjusting the position of this surface 72 and consists of a screw 73 which is threaded into the mounting plate 11 and engages the block 71 as shown particularly in FIGURES 1 and 3. Normally, this stop 72 is positioned so that the end 39a of the lever 39 does not go downwardly as much as the roller 31 goes downwardly because the inertia of the roller 31 is sufficient to carry it to its lowermost position after it has been rapidly accelerated by the lever 39.

Operation of my intermittent film transport in performing my method may now be briefly described as follows. Let it be assumed that a perforation of the film 13 is engaged with the registration pin 21 and that the film is being held in place on the curved shoe 18. The spring 41 on the roller 31 pushes downwardly on the film 13 to apply a moderate tension on the film to hold the film securely against the registration pin 21 and the curved film shoe 18. However, the tension of the spring is insufficient to cause stretching of the perforation in the film and engagement with the registration pin 21 or to cause movement of the film during exposure of the film.

During the time that the film is being held by the registration pin 21, the mechanism continues to operate so that the film is continuously advanced by the feed sprocket 12 over the snubbing post 17. This additional film which is fed by the feed roller 12 forms a slightly larger loop over the snubbing post 17 as shown particularly in FIGURE 2. This slack which develops over the snubbing post 17 and above the registration pin 21 as viewed in FIGURE 2 does not permit the film to come out of engagement with the registration pin 21 because the roller 26 holds the film against the shoe.

At the same time that the film is being continuously fed into the mechanism, film is being continuously taken up by the take-up sprocket 16. Since the film is being held by the registration pin 21, the taking up of film by the take-up sprocket 16 causes lifting or raising of the roller 31 against the force of the spring 41. During the time that this is occurring, the spiral-shaped cam 68 is also rotating and moving the end 39b of the lever 39 downwardly and the end 39a upwardly so that a substantially uniform force is applied and maintained by the spring 41 to tension the film 13 on the film shoe.

After the exposure has been completed on the film and just before the lever 39 drops down the step 68a, the cam 49 operates the push-off bar 44 to push the film to the left as viewed in FIGURE 2 off the registration pin 21. This permits the film to be pulled downwardly by the roller 31 under the force of the spring 41. In addition, at substantially the same time, the spiral cam rotates so that the lever 39 drops down into the step 68a and the right-hand end of the lever 39 strikes the enlarged portion 37a of the pin 37 under the force of the large spring 64 to rapidly accelerate the roller 31 and the associated mechanism together with the film 13 downwardly and across the registration pin 21 and the film shoe 18. In the meantime, the push-off bar 44 has been released and the next perforation in the film can readily move into engagement with the registration pin 21 and drop onto the registration pin to again hold the film stationary for a predetermined period of time.

Thus, it can be seen that with my intermittent film transport that instead of relying upon a single means such as a single spring for the pull-down of the film, I have provided additional means for pulling the film down very rapidly which is only effective during the time that the film is being pulled down so that relatively moderate forces are being applied to the film while it is being stationary so that the film does not move or is not deformed during the time it is being exposed.

As pointed out in my copending application Serial No.

151,811, filed November 13, 1961, the snubbing post 17 serves to absorb a considerable amount of the forces which are applied to the film when a perforation in the film engages the registration pin 21 so that the perforation in the film is not stretched or torn.

Another embodiment of my intermittent film transport is shown in FIGURES 5 and 6. Many of the parts are substantially identical to the parts shown in the embodiment in FIGURES 1–4. These parts are identified with the same numbers. The take-up sprocket has been modified and is identified as 16a. It is provided with a ratchet wheel 81 adjacent the mounting plate 11. The ratchet wheel is adapted to be engaged by a pawl 82 which is pivotally mounted on a pin 83 affixed to a bar 84 which is secured to the plate 11 by suitable means such as screws 86. The screws 86 extend through slots 87 and 88 provided in the bar 84 and are threaded into the mounting plate 11. The slots 87 and 88 extend at right angles to each other to make it possible to shift the position of the pin 83 and, therefore, the fulcrum for the pawl 82 for timing purposes as hereinafter described. A block 89 is mounted on one end of the pawl 82. The block is provided with a downwardly extending portion 91 which has a slot or elongate hole 92 therein. A roller 93 is rotatably mounted within the slotted hole 92 for movement within the slot 92. Means is provided for continuously and yieldingly urging the roller 93 downwardly in the slot 92 and consists of a spring 94 which has a central portion 94a secured to the block 89 by suitable means such as a screw 96. The extremities 94b of the spring 94 engage the roller 93 and urge it downwardly in the slot 92. This spring 94 serves to place a moderate tension upon the film 13 to hold it securely against the registration pin 21 and the film shoe 18.

The additional means for accelerating the film after it has been released from the registration pin 21 consists of the ratchet wheel 81 and the pawl 82. The pawl 82 is yieldably and continuously urged against the ratchet wheel 81 by a relatively strong spring 96 which has one end secured to an extension 97 as provided on the block 89 and has the other end secured to a pin 98 affixed to the mounting plate 11.

In the embodiment shown in FIGURES 5 and 6, it can be seen that the shaft 51 is driven by a worm 101 which is driven by a worm gear 102. The worm gear is driven from a drive shaft 103. The drive shaft 103 is directly connected to the feed sprocket 12 and, in addition, drives a timing gear 104. The timing gear 104 drives the timing belt 106 which drives another timing gear 107. The timing gear 107 is mounted on a shaft 108 which drives the take-up sprocket 16. Thus, it can be seen that the shaft 51 and the cam 49 driven thereby operate in synchronism with the feed sprocket 12 and the take-up sprocket 16.

Operation of the intermittent film transport shown in FIGURES 5 and 6 may now be briefly described as follows. During the time that the film is being retained by the registration pin 21, the film is being fed by the feed sprocket 12 to provide slack in the film above the snubbing post 17 and the registration pin 21. At the same time, film is being taken up by the take-up sprocket 16a which causes the roller 93 to be lifted upwardly in the slot 92 against the force of the spring 94. The slot 92 is dimensioned so that there is adequate space for movement of the roller in an upward direction until the film is released from the registration pin. At the same time this is occurring, the right-hand end of the pawl 82 is being gradually raised by the ratchet wheel 81 against the force of the spring 96 to also lift the block 89 which carries the roller 93 so that during the time that the film is retained by the registration pin 21, the tension on the film is substantially constant with no stretching of the perforation in the film or movement of the film during exposure of the same.

As soon as exposure has been completed, the cam 49 causes movement of the push-off bar 44 to remove the film 13 from the registration pin to permit it to be moved downwardly by the force of the spring 94 on the roller 93. As soon as the film is removed from the registration pin, the pawl 82 drops between the teeth 81a provided in the ratchet wheel 81 under the forces of the relatively strong spring 96 to rapidly accelerate the roller 93 and associated mechanism downwardly together with the film 13 to provide a very fast pull-down for the film. Pull-down continues until the next perforation of the film engages the registration pin 21. As previously explained, a substantial portion of the shock is taken up by the snubbing post 17 as the perforation moves into engagement with the registration pin 21. The film is then held stationary for a predetermined period of time to permit exposure of the film. During this time, the same sequence of operation as hereinbefore described takes place.

The screws 86 in the slotted holes 87 and 88 make it possible to shift the position of the fulcrum 83 for the ratchet 82 so that the ratchet 82 drops into the recesses provided on the ratchet wheel 81 at the proper times.

In the arrangement shown, the ratchet wheel 81 travels only one-tenth the speed that the shaft 51 travels and, for that reason, the ratchet wheel 81 has been provided with ten teeth 81a. Thus, the arrangement which is shown in FIGURES 5 and 6 will give the same speed of operation as the arrangement shown in FIGURES 1–4.

It is possible to eliminate the spring 94 and slot 92 and to rely upon the springiness of the film as it passes around the roller 93. The take-up sprocket is positioned so the film loop is not quite tight but so that the compliance of the film holds it against the register pin during exposure.

Still another embodiment of my invention is shown in FIGURES 7 and 8. In this embodiment, a roller 111 engages the film 13 and is rotatably mounted upon a lever 112 which is pivoted on the mounting plate 11 by a shaft 113. The roller 111 is yeildably urged downwardly with a moderate force by a spring 114 which has one end secured to an ear 116 affixed to the lever 112 and has the other end secured to a pin 117 provided on a clip 118 secured to the mounting plate 11 by a screw 119.

The means for providing additional acceleration for fast pull-down consists of a lever 121 which has one end rotatably mounted on the shaft 113. The lever extends upwardly as shown in FIGURES 7 and 8 and is provided with a cam surface 121a which is adapted to be engaged by a cam member 122 affixed to the shaft 51. Means is provided for forming a cooperative relationship between the cam lever 121 and the lever 112 and consists of yoke 123 which is provided with spaced ears 123a and 123b. The yoke 123 is fixed to the shaft 113 so that the cam lever 121 extends upwardly between the ears 123a and 123b. Yieldable means in the form of a spring 124 having one end mounted on ear 123b and having the other end mounted in the cam lever normally urges the ear 123a into engagement with the cam lever. A block 126 secured to the plate 11 by a screw 127 carries an adjusting screw 128 which serves as a stop for the cam lever 121.

Operation of the embodiment shown in FIGURES 7 and 8 is very similar to that of the embodiments hereinbefore described. During the time that the film is held stationary on the registration pin 21, the spring 114 applies a moderate tension to the film to retain it in engagement with the registration pin and the film shoe. As the film is taken up by the sprocket 16, the roller 111 is raised against the force of the springs 114 and 124. As soon as the film is pushed off of the registration pin by the push-off bar 44, the spring 114 pulls the roller 111 together with the film 13 downwardly. As the same time, the cam 122 strikes the lever 121 to rapidly accelerate the roller 111 and the film 13 downwardly to provide a very fast pull-down for the film in the same manner as hereinbefore described.

It is apparent from the foregoing that I have provided a new and improved intermittent film transport which provides a very rapid pull-down and in which the film is held very steady during the time it is being exposed. This makes the intermittent film transport particularly adapted for very precise video recording. However, it is readily apparent that the same mechanism can be utilized in motion picture projectors and cameras of various sizes and types.

I claim:

1. In an intermittent film transport for advancing film having perforations therein, a film shoe against which the film is adapted to ride, means mounted on one side of the film shoe and serving as an arresting guide, a fixed registration pin mounted in said shoe away from said arresting guide and adapted to engage the perforations in the film to hold the film stationary on the film shoe in a predetermined zone, means continuously feeding the film over the arresting guide and over the film shoe, means mounted on the other side of the film shoe for continuously taking up the film, roller means engaging the film between the film shoe and the take up means, means yieldably applying a moderate force continuously to the roller means to cause the roller means to continuously urge the film past the registration pin, a push-off bar adapted to engage the film in the vicinity of the registration pin, a lever arm, means pivotally mounting the lever arm intermediate the ends thereof, means forming a connection between one end of the lever arm and the roller means, cam means engaging the other end of the lever arm, means rotatably mounting the cam means, yieldable means engaging the lever arm and serving to move the lever arm in a direction so that it is urged into engagement with said cam means, and means for causing movement of said push-off bar and said cam means so that said push-off bar causes said film to be pushed off of said registration pin and substantially simultaneously causes said lever arm to be released so that the lever arm is moved rapidly into engagement with the roller means under the force of the yieldable means to thereby rapidly accelerate the roller means and the film to provide a fast pull-down of the film.

2. A transport as in claim 1 wherein the means connecting the lever arm to the roller means includes a pin, the lever arm being formed with a hole through which the pin extends and a spring disposed on the pin between the lever arm and the roller means.

3. In an intermittent film transport for advancing film having perforations therein, a film shoe against which the film is adapted to ride, means mounted on one side of the film shoe and serving as an arresting guide, a registration pin disposed adjacent said film shoe adapted to engage the perforations in the film to hold the film stationary on the film shoe in a predetermined zone, means continuously feeding the film over the arresting guide and over the film shoe, means mounted on the other side of the film shoe for continuously taking up the film, roller means engaging the film between the film shoe and the take up means, means for yieldably applying a moderate force continuously to the roller means to cause the roller means to urge the film past the registration pin and out of said zone, means for intermittently causing relative movement between the film and the registration pin to permit the means yieldably applying a force to the film to urge the film past the registration pin, and mechanical means for applying an additional force to the roller means when the film is released by the registration pin to rapidly accelerate the roller means and the film to provide a fast pull down for the film, said last named means including a lever engaging the roller means and cam means engaging the lever, said cam means serving to position said lever and said roller means as the film is taken up so that a substantially uniform tension is applied to the film while it is held by the registration pin.

4. A transport as in claim 3 wherein said last named means also includes spring means secured to the lever for urging the lever into engagement with said cam means and wherein said cam means releases said lever to permit said additional force to be applied to said roller means.

5. In an intermittent transport for advancing a flexible elongate element having perforations therein, a registration pin adapted to engage perforations in the element to hold the element stationary in a predetermined zone, means on one side of said registration pin for advancing the element towards the registration pin, means on the other side of the registration pin for taking up the element, means engaging the element between the registration pin and the take-up means and yieldably applying a force continuously to the element to urge the element past the registration pin, means for intermittently causing relative movement between the registration pin and the element so that the registration pin is out of engagement with the element to thereby permit the means yieldably applying a force to the element to draw the element past the registration pin, and additional mechanical means for applying additional forces to the means engaging the element after the element is out of engagement with the registration pin to rapidly accelerate the element past the registration pin, said means engaging the element including a roller engaging the element, said additional mechanical means including a lever arm, means pivotally mounting the lever arm intermediate the ends thereof, spring means disposed between one end of the lever arm and the roller, spring means secured to the lever arm adjacent the end of the lever arm engaged by said first named spring means, and cam means engaging the other end of the lever arm and normally serving to prevent movement of the lever arm in the direction it is pulled by said first named spring means until said element is out of engagement with said registration pin.

6. In an intermittent transport for advancing a flexible elongate element having perforations therein, a shoe against which the element is adapted to ride, a fixed registration pin disposed in relatively close proximity to said shoe and adapted to engage the perforations in the element to hold the element stationary in a predetermined zone on said shoe, means on one side of said shoe for advancing the element towards said shoe, means on the other side of said shoe for taking up the element, means engaging the element between said shoe and the take-up means and yieldably applying a force continuously to the element to urge the element past the registration pin and the shoe, means for intermittently moving the element out of engagement with the registration pin to thereby permit the means yieldably applying a force to the element to draw the element past the registration pin, and additional mechanical means for applying forces to the means engaging the element to rapidly accelerate the means engaging the element and to rapidly accelerate the element past the registration pin when the element is out of engagement with the registration pin, said additional mechanical means including a lever arm, means pivotally mounting the lever arm intermediate the ends thereof, cam means engaging one end of the lever arm, means for rotating the cam means, and means yieldably urging said one end of the lever arm into engagement with the cam means, said cam means being formed so that when the element is moved out of engagement with the registration pin, the lever arm is rapidly accelerated into engagement with the means engaging the element by the means yieldably urging said one end of the lever arm into engagement with the cam means.

7. In an intermittent film transport for advancing film having perforations therein, a film shoe against which the film is adapted to ride, means mounted on one side of the film shoe and serving as an arresting guide, a registration pin disposed in relatively close proximity to said film shoe and away from said arresting guide and adapted to engage the perforations in the film to hold the film stationary on the film shoe in a predetermined zone, means continuously feeding the film over the arresting guide and over the film shoe, means mounted on the other side of the film shoe for continuously taking up the film, roller means engaging the film between the film shoe and the take-up means, means for yieldably applying a moderate force continuously to the roller means to cause the roller means to urge the film past the registration pin, means for intermittently causing relative movement between the film and the registration pin to permit the means yieldably applying a force to the film to urge the film past the registration pin, and mechanical means for applying an additional force to the roller means when the film is released by the registration pin to rapidly accelerate the roller means and the film to provide a fast pull-down for the film, said mechanical means including a lever engaging the roller means and cam means for operating the lever.

8. A transport as in claim 7 together with yieldable means disposed between and engaging the roller means and the lever and permitting movement of the roller means relative to the lever in a direction at right angles to the axis of rotation of the roller means.

References Cited by the Examiner

UNITED STATES PATENTS 2,953,965   9/1960   Stiffler _____ 88—18

FOREIGN PATENTS 1,178,874   12/1958   France.
683,460   11/1939   Germany.
443,085   12/1948   Italy.

ROBERT B. REEVES, *Primary Examiner.*

RAPHAEL M. LUPO, SAMUEL F. COLEMAN,
*Examiners.*